(12) United States Patent
Datta et al.

(10) Patent No.: US 7,444,506 B1
(45) Date of Patent: Oct. 28, 2008

(54) SELECTIVE ENCRYPTION WITH PARALLEL NETWORKS

(75) Inventors: Sanchaita Datta, Salt Lake City, UT (US); Bhaskar Ragula, Salt Lake City, UT (US)

(73) Assignee: Ragula Systems, Salt Lake City, UT (US)

( * ) Notice: Subject to any disclaimer, the term of this patent is extended or adjusted under 35 U.S.C. 154(b) by 105 days.

(21) Appl. No.: 11/424,263

(22) Filed: Jun. 15, 2006

Related U.S. Application Data

(63) Continuation-in-part of application No. 11/284,860, filed on Nov. 22, 2005, now abandoned, and a continuation-in-part of application No. 10/034,197, filed on Dec. 28, 2001.

(60) Provisional application No. 60/712,636, filed on Aug. 30, 2005.

(51) Int. Cl.
*H04L 9/00* (2006.01)

(52) U.S. Cl. .......................... 713/153; 726/1; 709/241; 370/238

(58) Field of Classification Search ................. 713/151, 713/152, 153, 154, 160, 162, 155; 726/2, 726/3, 11, 10, 13, 26; 709/201, 232, 244; 370/270, 392
See application file for complete search history.

(56) References Cited

U.S. PATENT DOCUMENTS

| 5,398,012 | A | | 3/1995 | Derby et al. |
| 5,548,646 | A | * | 8/1996 | Aziz et al. ................... 713/153 |
| 5,822,433 | A | * | 10/1998 | Bottle et al. ................. 713/155 |
| 5,898,784 | A | * | 4/1999 | Kirby et al. .................. 713/153 |
| 5,948,069 | A | * | 9/1999 | Kitai et al. ................... 709/240 |
| 6,055,229 | A | | 4/2000 | Dorenbosch et al. |
| 6,160,819 | A | | 12/2000 | Partridge et al. |
| 6,253,247 | B1 | | 6/2001 | Bhaskar et al. |
| 6,268,789 | B1 | | 7/2001 | Diamant et al. |
| 6,295,276 | B1 | | 9/2001 | Datta et al. |
| 6,493,341 | B1 | | 12/2002 | Datta et al. |
| 6,717,943 | B1 | | 4/2004 | Schwering |
| 6,771,597 | B2 | * | 8/2004 | Makansi et al. ............. 370/230 |
| 6,775,235 | B2 | * | 8/2004 | Datta et al. ................. 370/238 |
| 6,810,035 | B1 | | 10/2004 | Knuutila et al. |

(Continued)

OTHER PUBLICATIONS

Pierson: Pierson et al., "Context-Agile Ecryption for High Speed Communication Networks", ACM SIGCOMM Computer Communication Review, vol. 29, Issue 1, 1999.

(Continued)

*Primary Examiner*—Nasser G Moazzami
*Assistant Examiner*—Shanto M Abedin
(74) *Attorney, Agent, or Firm*—Ogilvie Law Firm

(57) ABSTRACT

Methods, devices, and systems for efficient secure parallel data transmission are disclosed. Data from a local source is divided, with one portion being encrypted and then sent over an open public network, and another portion being sent over a private network without any such supplemental encryption. The portions are thus transmitted at least partially in parallel over networks having different security characteristics, in a manner that helps compensate for the lower security of the open public network without imposing unnecessary encryption overhead on packets being sent over the more secure private network.

25 Claims, 5 Drawing Sheets

U.S. PATENT DOCUMENTS

| | | | |
|---|---|---|---|
| 6,829,357 B1 | 12/2004 | Alrabady et al. | |
| 7,174,452 B2* | 2/2007 | Carr | 713/151 |
| 2002/0087724 A1* | 7/2002 | Datta et al. | 709/241 |
| 2002/0141585 A1* | 10/2002 | Carr | 380/255 |
| 2003/0018889 A1 | 1/2003 | Burnett et al. | |
| 2003/0191843 A1 | 10/2003 | Balissat et al. | |
| 2003/0235308 A1 | 12/2003 | Boynton et al. | |
| 2005/0243857 A1 | 11/2005 | Hofstaedter et al. | |

OTHER PUBLICATIONS

SANS: postings from forum.sans.org, 2001.

HIPAA/Price: Price, "HIPAA and security issues—how dietitians and diabetes educators can follow the law", from www.gettingthatjumpstart.com, 2003.

IPVPN: FatPipe IPVPNTM brochure, www.fatpipeinc.com/ipvpn/ipvpn.pdf, various dates.

* cited by examiner

SELECTIVE ENCRYPTION WITH PARALLEL NETWORKS

RELATED APPLICATIONS

This application is a continuation-in-part of, incorporates all material in, and claims priority to, U.S. patent application Ser. No. 11/284,860 filed Nov. 22, 2005 now abandoned. This application is also a continuation-in-part of, incorporates all material in, and claims priority to, U.S. patent application Ser. No. 10/034,197 filed Dec. 28, 2001. This application also incorporates all material in, and claims priority to, U.S. provisional patent application Ser. No. 60/712,636 filed Aug. 30, 2005.

BACKGROUND

U.S. Pat. No. 6,253,247, by the inventors of the present invention, describes methods and systems for transmitting a user's data between two computer networks over physically separate telephone line connections which are allocated exclusively to the user. Data packets are multiplexed onto the separate connections and sent concurrently. The set of connections constitutes a virtual "fat pipe" connection through which the user's data is transmitted more rapidly. However, encryption is not discussed.

U.S. Pat. Nos. 6,295,276 and 6,493,341, also by the inventors of the present invention, describe methods, configured storage media, and systems for increasing bandwidth between a local area network ("LAN") and other networks by using multiple routers on the given LAN. Data packets are multiplexed between the routers. On receiving data destined for an external network, a controller or gateway computer will direct the data to the appropriate router. In addition to providing higher speed connections, these inventions provide better fault tolerance in the form of redundant connections from the originating LAN to a wide area network such as the internet. Encryption is not discussed in either patent.

U.S. Pat. No. 6,775,235, by the inventors of the present invention, describes methods, configured storage media, and systems for communications using two or more disparate networks in parallel to provide load balancing across network connections, greater reliability, and/or increased security. A controller provides access to two or more disparate networks in parallel, through direct or indirect network interfaces. When one attached network fails, the failure is sensed by the controller and traffic is routed through one or more other disparate networks. When all attached disparate networks are operating, one controller preferably balances the load between them. Encryption, message-splitting between networks, and other security concepts are discussed, but the present invention is not described.

Other aspects of technology may also be helpful in understanding the present invention. These will be apparent to those of skill in the art.

SUMMARY

The present invention provides tools and techniques for data transmission and related activities. In some embodiments, the invention provides a method of preparing data for transmission, including receiving data packets; treating a first portion of the data packets with a supplemental security measure; submitting the treated packets for transmission over a first network path; and submitting the untreated second portion of the data packets for transmission over a second network path; wherein transmission of the data packets utilizes at least two networks at least partially in parallel in a manner calculated to efficiently compensate for the lower security of the second network.

In some embodiments, the invention provides a controller for data transmission, including a first interface to a first wide area network; a second interface to a second wide area network; a supplemental security module which receives data, treats the data with a supplemental security measure, and directs treated data to the first interface; a third interface which receives a data from a LAN or other local source, directs a first portion to the supplemental security module, and directs a second portion to the second interface bypassing the supplemental security module; wherein the controller receives the data, treats only the first portion to supplement its security prior to WAN transmission, and transmits the data at least partially in parallel through the network interfaces.

In particular, one controller for efficient secure parallel data transmission includes an internet network interface which is configured to interface the controller to an internet node; a private network interface which is configured to interface the controller to a private network; an encryption module which receives data, encrypts the data, and directs encrypted data to the internet interface; a local area network interface which is configured to receive a sequence of data packets, direct some of the data packets to the encryption module and directs the remaining data packets of the sequence to the private network interface bypassing the encryption module; wherein the controller receives data, encrypts only some of the data, and transmits the all the received data packets at least partially in parallel through the network interfaces. Some embodiments include an encryption module which receives encrypted data (e.g., from a remote controller), decrypts it, and directs decrypted data to a local area network interface.

These examples are merely illustrative. The present invention is defined by the claims, and to the extent this summary and/or incorporated material conflicts with the claims, the claims should prevail.

DRAWINGS

To illustrate the manner in which the advantages and features of the invention are obtained, a description of the present invention is given with reference to the attached drawings. These drawings only illustrate selected aspects of the invention and thus do not fully determine the invention's scope.

DETAILED DESCRIPTION

Introduction

The present invention provides tools and techniques to assist data transmission. The invention is illustrated by specific examples, but it will be appreciated that other embodiments of the invention may depart from these examples. For instance, specific features of an example may be omitted, renamed, grouped differently, repeated, instantiated in hardware and/or software differently, performed in a different order, or be a mix of features appearing in two or more of the examples.

Definitions of terms are provided explicitly and implicitly throughout this document. Terms do not necessarily have the same meaning here that they have in general usage, in the usage of a particular industry, or in a particular dictionary or set of dictionaries. The inventors assert and exercise their right to their own lexicography.

Overview of Data Transmission Methods, Devices, and Systems

Figure 5:
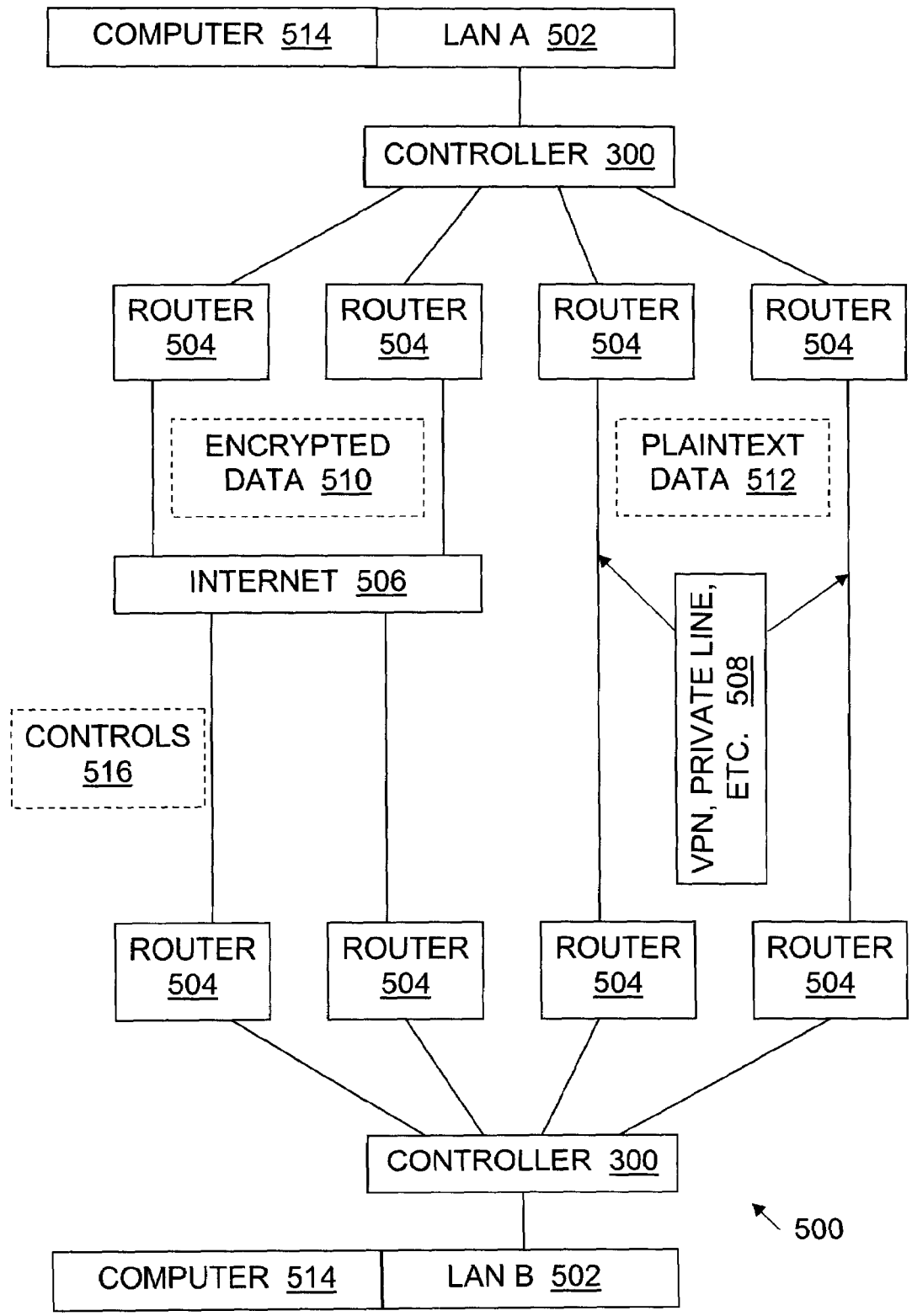
FIG. 5 is a diagram illustrating some systems according to the present invention.
Figure 6:
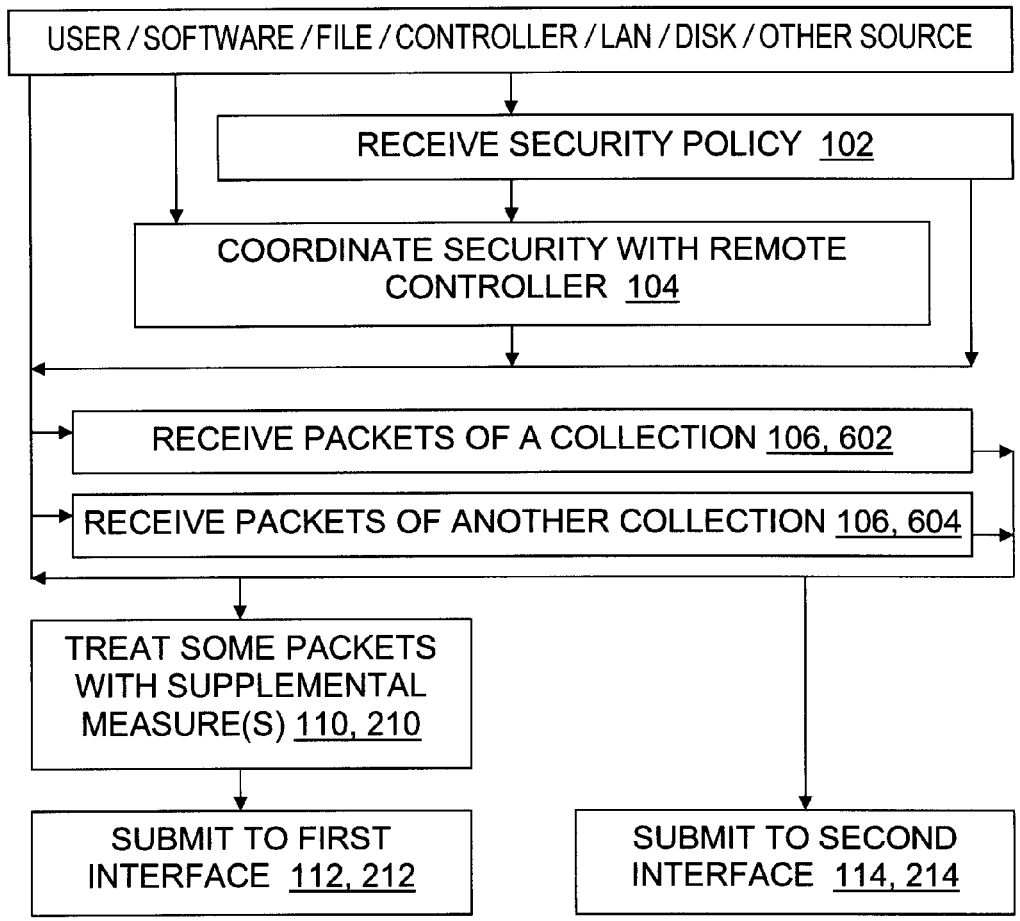
FIG. 6 is a flowchart further illustrating methods of the present invention.

With reference to the figures, consider two computer networks connected to each other over multiple wide area network (WAN) paths. Such a system may include two local area networks 502 as endpoints, as shown in FIG. 5, or the endpoints may be connected by parallel networks in some other configuration. One type of path (shown, e.g., on the left side of FIG. 5) is over the internet 506, while a second type of path (right side of FIG. 5) is over private lines 508. The data flow over private lines is relatively secure and private since this data does not mix with data from any other network. It is isolated. Therefore there is some level of protection even if one does not encrypt the data for security purposes. By contrast, the data flow over the internet channel is relatively insecure. Therefore, it may need to be encrypted for security and privacy reasons. More generally, other security/privacy measures may be desirable, such as scrambling packets, authentication, watermarking, and the like. More generally, instead of the internet 506 and a private network 508, the system 500 may have two networks in parallel use with one network being more secure/private than the other. For present purposes, privacy is an aspect of security.

In some embodiments of the present invention, a network controller 300 balances, failovers, and/or otherwise allocates the data flow between two or more such parallel computer networks. The controller may handle various types of traffic—IP, IPX, TCP, UDP, etc. It will selectively switch packets or sessions to more fully utilize the multiple data paths over multiple lines. It will also create encrypted data tunnels between the multiple locations, e.g., between LANs A and B. One feature of some embodiments of this controller 300 is that the encryption tunnels are such that the data flow over the private lines is not encrypted. Only the data over the public internet based lines is encrypted. This allows for more efficient data flow, since encryption adds processing overhead and latency, or other costs such as special-purpose hardware and maintenance costs. Thus, one achieves more efficient data communication with less latency across private/more secure lines with the encrypted data flowing only over the internet/less secure lines.

More generally, if security/privacy measures other than encryption are used (or used in addition to encryption), then the network controller 300 responds to the relative lack of security/privacy on an internet path (as opposed to a private line path) by automatically employing enhanced security/privacy measures on the internet path. In some embodiments, the employment of increased security/privacy measures is a default that can be overridden by an administrator and/or by an end user.

In some embodiments, the router 504 functionality is combined in a single box with the other controller functionality discussed herein. A configuration like that shown in FIG. 5 would accordingly be modified to show one or more routers 504 inside the controller 300 in a block diagram of the configuration. That is, some embodiments of the controller 300 include router functionality, while other embodiments of the controller do not. Router functionality in and of itself is known in the art, but its combinations with other functionality as discussed herein are believed to be new.

In one alternate embodiment, the endpoint role taken by a LAN 502 is taken instead by a single computer 514. Depending on the embodiment, the system 500 may include no LAN, one LAN, two LANs, or multiple LANS as endpoints, and zero or more computers or gateways as endpoints, provided at least two endpoints are present. That is, the invention can be embodied in system 500 configurations using more than two controllers and/or more than two LANs/computers that send/receive data. In one alternate embodiment, the roles of a controller and LAN are taken instead by a controller 300 that is implemented in software which runs on a single computer 514. More generally, the controller aspect of the invention may be implemented in hardware, software, or both, in various embodiments.

Some embodiments make the enhanced security/privacy dynamically configurable. For instance, in some cases the sending controller 300 at one location in system 500 queries the receiving controller 300 at another location in system 500 to obtain a list 516 in a predetermined format identifying the available security/privacy measures. It then responds with either an election 516 specifying which measure(s) it will use (on a per session basis, for instance) or else it responds with a response 516 indicating that the available measure(s) is/are inadequate and the user data will therefore not be sent. The administrator and/or end user is notified accordingly.

The election of measures to use if available, and/or the specification of minimum acceptable sets of measures for a given session or a given file, can be based on a policy 318 specified by an administrator and/or an end user. In addition to electing different types of security/privacy measure (e.g., encryption, authentication, watermarking), in some embodiments one may specify types of encryption (e.g., symmetric/asymmetric, or particular algorithms or encryption standards).

In short, the controller treats a portion of a data unit with a supplemental security measure such as encryption in response to a difference in the security characteristics of networks to be used in parallel to transmit the data unit. Additional examples and detail about embodiments of the invention will now be provided.

Data Transmission Methods

FIGS. 1, 2, 6 and 7 are flowcharts illustrating methods of the present invention. Although the other figures do not contain flowcharts, they may also help one understand methods of the invention. Likewise, the operation of devices and systems of the present invention may be better understood by understanding the methods, including those illustrated by FIGS. 1, 2, 6 and 7.

Figure 1:
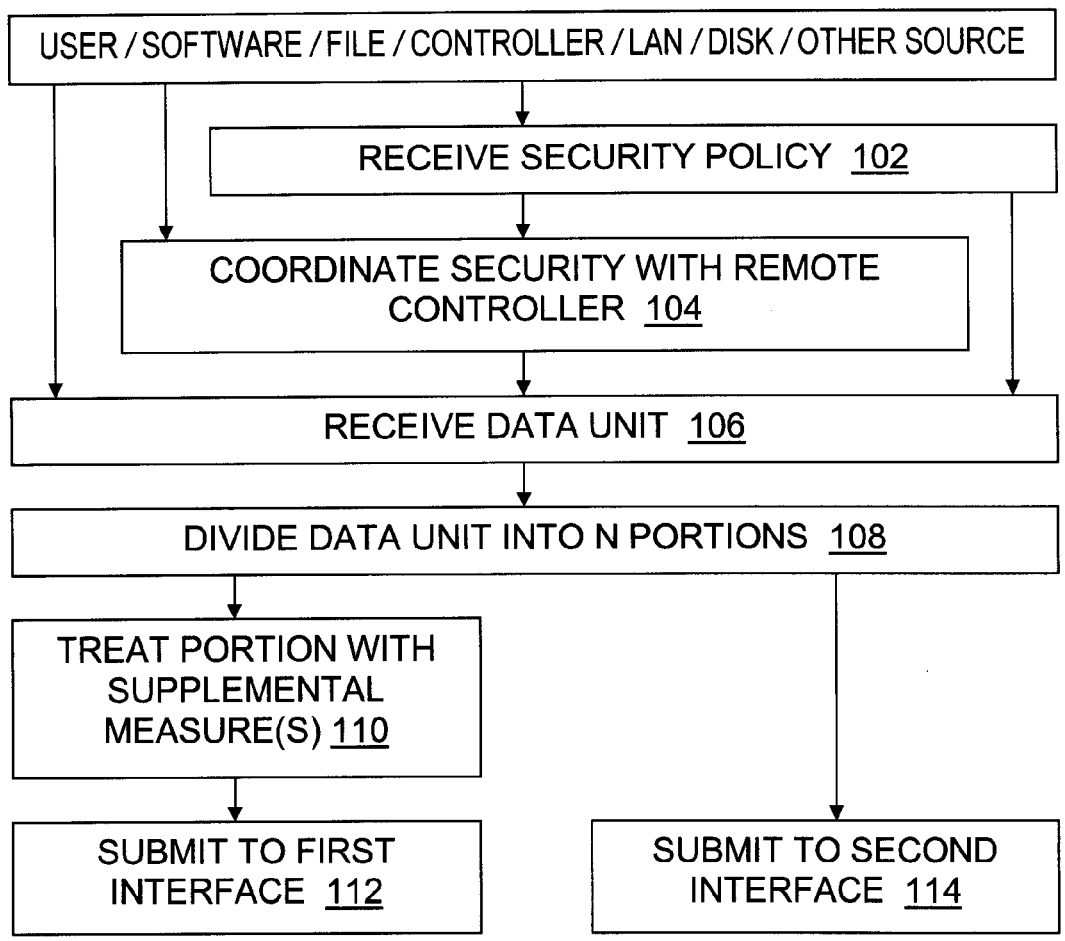
FIG. 1 is a flow chart illustrating some methods according to the present invention.

During a policy receiving step 102, a controller or system receives a security policy 318 which guides or determines data protection measures. The policy may be received 102 in various ways from various sources, e.g., it may be received interactively from an administrator or an end user; it may be embedded in software or firmware or a configuration file provided by a device 300 manufacturer; it may be received 104 by transmission from another controller 300 with which data has been or would be exchanged through parallel network transmission as discussed herein. The policy specifies which data-protecting steps to take under which circumstances. As indicated in FIG. 1, the policy receiving step is optional in the sense that not every embodiment need allow a choice of data-protecting actions; in some controllers 300, the data-protecting actions are specified when the controller is manufactures and/or when it is installed, and the user or administrator need not (cannot) readily change that fixed single policy. In some embodiments, the invention includes receiving 102 a security policy specification 318 from at least one of an administrator, an end user, and a controller device, and a data treating step 110 is responsive to the security policy specification in that it either implements the policy or else reports its inability to do so.

As an example, a policy may specify that each word processor or graphics file transmission session is to be divided 108 in interleaved manner into two portions each containing multiple parts, that one portion 510 is to be encrypted 110 by the controller 300 using a specified encryption algorithm and then transmitted 112 over the internet 506 and that the other portion 512 is to be transmitted 114, at least partially in parallel with the first portion, over a virtual private network 508 connection without being first encrypted. In addition to or instead of encryption, a policy may specify other data-protecting steps, such as watermarking, sending plaintext with corresponding digital signatures for tamper detection, and so on.

As indicated by a coordinating step 104, in some embodiments and some situations, one controller 300 communicates 104 with another controller 300 to coordinate data security measures. The two (or more) communicating controllers may differ from one another in some respects, such as memory size, processing power, manufacturer, available encryption options, political jurisdiction specifying applicable laws governing encryption, and other characteristics. But the controllers may still be able to communicate with each other sufficiently to agree on a level of encryption to be used for an upcoming data transmission, for example.

During a data receiving step 106, the controller 300 receives data which is to be transmitted (subject to the security policy, bandwidth availability, coordination, and like constraints) to a destination after suitable preprocessing by the controller. Such data is received 106 over an interface 304 from a local data source, such as a LAN interfaced with the controller, a RAID array, a local hard disk, a sensor, or another data source. The data for the controller 300 to prepare and transmit may have been generated locally, or it may have been forwarded to the controller's local source for protected transmission to its next destination after being received locally from some other distant location.

The data is treated in some embodiments of the controller 300 as a logical data unit, whose boundaries ultimately reflect some decision by a person as to what data is closely related enough to other data to be grouped with it, in the form of a file, for instance, or a database, or a website, linked list, or other linked data structure. A data unit may be a packet, a group of packets, a set of packets in a single session, a set of packets containing data from a single file, or a set of packets from a group of sessions in a random order, for instance. One may thus assume that having the entire data unit is at least helpful, and perhaps necessary, as opposed to having only a portion of the data unit, in whatever human endeavor the data pertains to. In other embodiments, the controller merely receives 106 the data as packets, without regard to the possible relation of a given packet to other packets in the context of a file, database, etc. As used herein, a "collection" of packets may include packets of one data unit, of multiple data units, and/or packets from portions of one or more data units.

During a data dividing step 108, some embodiments of the controller divide the received data unit into a first portion for transmission over a first path and a second portion for transmission over a second path. For instance, a set of packets containing data from a single file may be divided into N groups of packets for transmission over N networks (by round robin, in a weighted distribution, or otherwise) between the paths. More generally, the data unit includes a set of packets in a single session; a session during which data unit from a user is divided by the dividing step; a database thus divided; a tree, website, website subset, web page with embedded and/or linked in elements, or other linked structure; XML structure; or other group of data that someone considered closely related enough to group together. In other controller embodiments, as indicated for example in FIG. 8, files and other data units are divided by the controller and then transmitted over the multiple pathsIn some embodiments of the kind illustrated in FIG. 3, data unit is divided 108 at least partly in response to at least one of the following: data throughput, transmission latency, transmission bandwidth, time required for encryption of data. For instance, if it takes four or five times as long to send a packet through the treatment 110 and the first interface as it does to send a packet through the second interface, because of the time needed for encryption 110 or the latency of the line, then one embodiment sends 25% of the data unit's packets through the treatment and the first interface and sends the other 75% through the second interface.

In some embodiments, the dividing step divides the data unit at least partly in response to at least one of the following: first path load, second path load, first path failure, second path failure. Measurements of path load, throughput, latency, and the like can be taken for each path using familiar tools and techniques, and maintained in path quality variables 422. Such variables 422 may also be tracked in controllers which merely receive 106 a stream of previously divided packets. The path quality may influence the allocation of data between the interfaces 312, 314, in a manner consistent with or determined by the policy 318. The security policy can specify how to balance throughput (which is probably highest with no treatment 110 and pushing data though both interfaces as fast as possible) against security (which is increased by encryption, and by dividing data between networks). The user may have the option of specifying the relative importance of throughput and security, for instance. In some embodiments, the load on the two (or more) parallel networks is dynamically adjusted, on a per-session or per-packet basis, to improve throughput. This may be subject to a specified minimum threshold for use of a given network, e.g., a policy 318 could specify that at least 20% of the data unit must be sent over the first interface 312 and at least 30% must be sent over the second interface 314.

The first path has a possibly empty first set of security characteristics, the second path has a second set of security characteristics, and the second set of security characteristics includes at least one distinguishing security characteristic that is not present in the first set of security characteristics. Examples of security characteristics include data-protecting measures taken after the data leaves the controller 300, e.g., a lack of physical or other connections between the path and open paths on the internet, encryption by routers on the path or other data encryption on the path, packet scrambling, security provided by the network under IPv6 or otherwise, user authentication, transmission source and/or destination authentication, data watermarking, data tamper-detection, physical security restricting physical access to machines in one of the paths, and so on. In some cases, each path's set of security characteristics includes data encryption, and the distinguishing security characteristic of the relatively more secure path provides different encryption than the first set of security characteristics. For instance, a relatively more secure second path may use 128-bit encryption while a less secure first path normally uses 40-bit encryption.

During a treating step 110, at least one portion of the data unit is treated by a security module 310 of the controller with some supplemental data-protecting measure not provided by the network path over which that portion of the data unit will travel after it leaves the controller 300. For instance, the data portion may be encrypted and/or watermarked and/or digitally signed for tamper detection, within the controller 300. In some embodiments, the supplemental security measure 310 includes encrypting data, and the distinguishing security characteristic of the relatively secure network path includes data encryption provided outside the controller 300. At least one other portion of the data unit is not thus treated, because security for that other portion will rely on the security measures provided by the other network, not those available from the controller. By treating the first portion of the data unit with a supplemental security measure that provides a data-protecting result not provided by the first set of security characteristics, the treated portion of the data is protected. By not thus treating the other portion of the data, system resources (processing cycles, memory space, user/administrator time) are conserved.

During steps 112 and 114, treated and untreated data unit portions, respectively, are submitted to network interfaces 312 and 314 for transmission over the less protected and more protected network paths, respectively. For instance, the less protected path may carry data (which was encrypted by the controller 300) over an open public network. Some examples of open public networks include those that are intentionally open, such as the internet 506, and those that may be unintentionally open, such as a wireless network which can be eavesdropped on from a public road. Transmission of the data thus utilizes at least two networks of different kinds at least partially in parallel. That is, transmission of the first portion chronologically at least overlaps in part transmission of the second portion, even if there are also times when only one of the disparate but parallel networks is actually carrying part of the divided data.

In some embodiments, the controller receives a security override 316 from an administrator and/or an end user. While the security override is in effect, the treating step 110 does not encrypt the first portion of the data unit. This override capability provides flexibility when throughput speed is considered more important than security, but it is preferably revocable in at least some embodiments.

Figure 2:
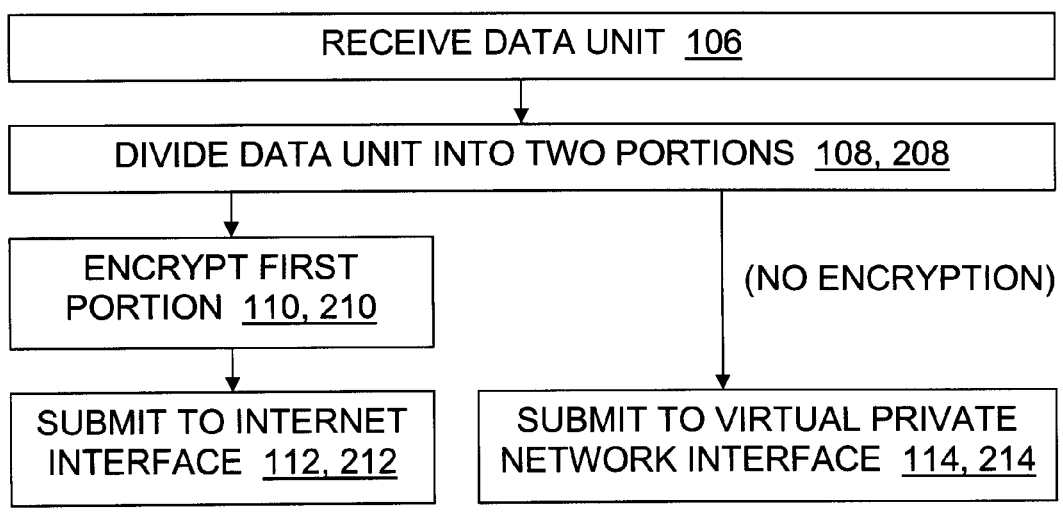
FIG. 2 is a flow chart further illustrating particular methods of the present invention.

FIG. 2 illustrates a subset of the methods illustrated by FIG. 1. In the methods of FIG. 2, the data unit is divided 208 into exactly two portions, while in the more general flow chart of FIG. 1, two or more portions are created from each data unit. In FIG. 2, the treatment step 110 includes at least encryption 210; in FIG. 1, treatment may include encryption but need not do so. In FIG. 2, no encryption is performed on the second data portion; in FIG. 1, the second (third, fourth, etc.) portion may be unencrypted, or it may be encrypted using a less secure algorithm than is used for the first portion. In FIG. 2, the open public network to which the treated (encrypted) data unit portion is submitted 212 is the internet 506; in FIG. 1, the first interface may connect to the internet or to some other relatively insecure network (security is assessed relative to the second network). In FIG. 2, data is submitted 214 to a virtual private network (VPN), which may overlay part of the internet; in FIG. 1, data is submitted 114 to such a VPN or to a private point-to-point line, or to some other relatively secure network.

In some embodiments, the first path sends data over the internet 506, the second path sends data over a private line 508, the invention encrypts 210 the first portion of the data unit before submitting that first portion for transmission over the internet, and the second portion of the data unit is transmitted over a private line without being encrypted.

Sending the same data over both networks (e.g., internet and VPN) in parallel is within the scope of the invention. Indeed, such duplicate transmission may be used in some embodiments to check the encryption/decryption routines by comparing plaintext data against decrypted data, or be used to gather throughput or other path quality measurements 422, or be present for other reasons. In some embodiments, a sequence of data packets can be sent over multiple paths and the receiving controller can reassemble the data unit while discarding multiple packets.

Figure 7:
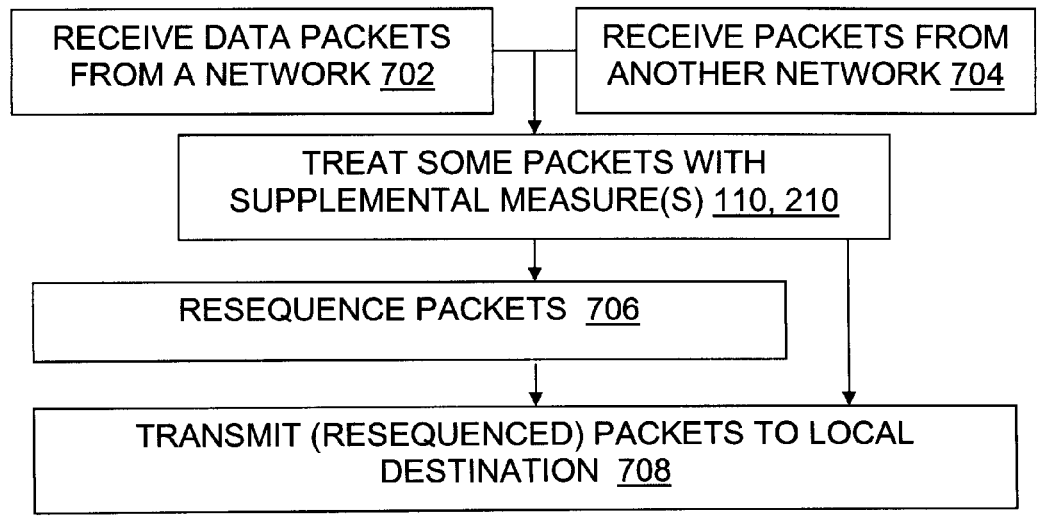
FIG. 7 is a flowchart illustrating some additional methods of the invention.

Much of the discussion above concerns data whose source is local and whose destination is remote, since transmission over the WANs is used to send the data in question to its destination. As illustrated in FIG. 7, however, some methods of the invention include locally receiving 702, 704 data packets from a remote source, for delivery to a local destination such as a LAN to which the controller 300 is attached through an interface 304. In such cases the controller may apply measures to reverse the security measures applied at the remote location, including decryption, reversal of IP and TCP header changes and/or validation of watermarks and/or digital signatures for tamper detection. In many cases the packets will be received 702, 704 in a different order than the order in which they were transmitted. Indeed, even if packets are received in the same sequence they were sent in, that sequence is not necessarily the order in which they should be delivered. For instance, VoIP packets should be delivered in the order in which they were created, which may well differ from their transmission and/or reception order. Accordingly, packet sequence numbers or the like are used by the controller to resequence 706 the packets before they are delivered 708 over the LAN interface 304.

Devices and Systems for Data Transmission

Figure 3:
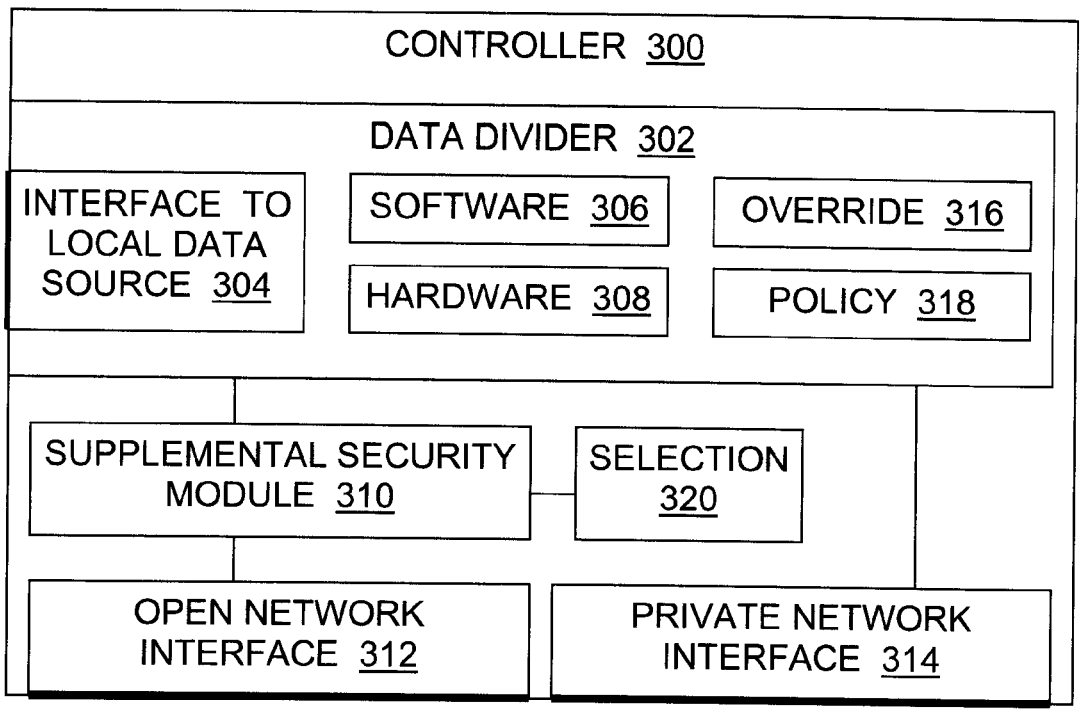
FIG. 3 is a block diagram illustrating some controller devices according to the present invention.

Turning the focus now to FIGS. 3, 4, 5 and 8, the invention also provides controllers, as well as systems containing one or more controllers. FIG. 3 shows a controller device 300 suitable for data transmission, with an interface 304 to a local data source, a first interface 312 to a first network such as the internet or another open public network, and a second interface 314 to a second network which is relatively secure such as a VPN or a private line. The controller 300 also has a supplemental security module 310 which receives data, treats the data with a supplemental security measure, and directs treated data to the first interface, a data divider 302 which receives a data unit, divides the data unit into a first portion and a second portion, directs the first portion to the supplemental security module, and directs the second portion to the second interface bypassing the supplemental security module.

Figure 8:
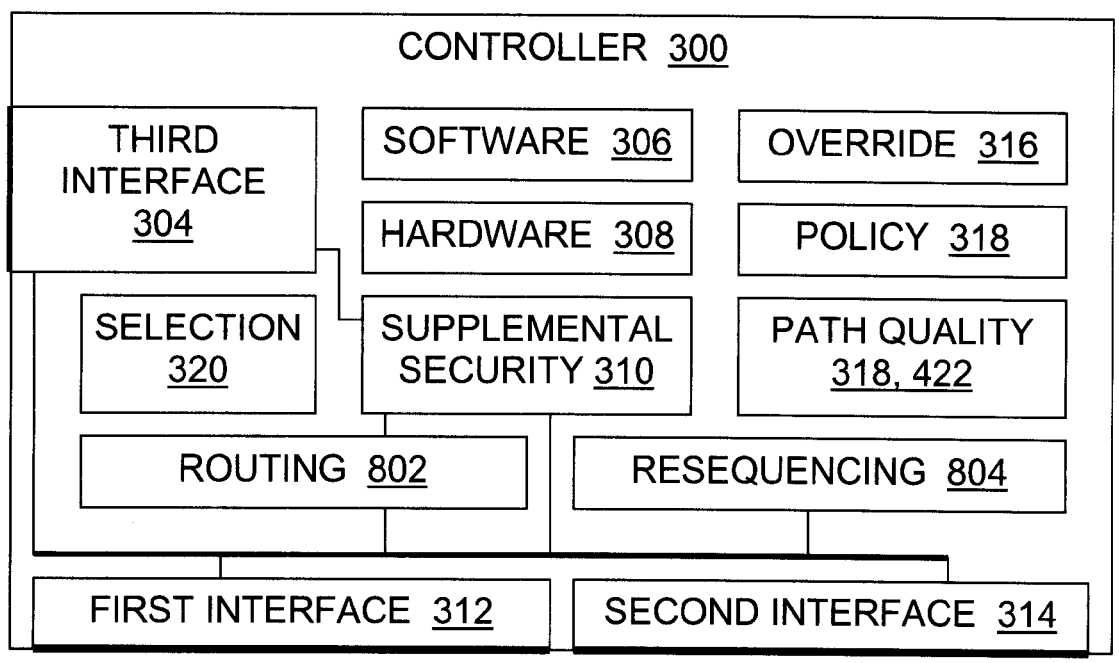
FIG. 8 is a block diagram illustrating some additional controller devices of the present invention

Other controller components are also illustrated in the figures. For instance, FIG. 8 shows a router module 802, and a resequencing module 804. The router module performs routing like that performed by exterior routers 504. The resequencer 804 restores received 702, 704 packets to the order specified by their packet numbers. Buses and other illustrated component linkages are merely illustrative, as those of skill in the art will connect the various components in a given implementation as needed to provide the desired functionality. However, power supplies, diagnostics, and the like are not shown, as the need for them should be assumed by those of skill.

As discussed above, in some embodiments the controller 300 receives 106 the data unit, divides 108 the data unit, treats 110 only the first portion of the divided data unit, and transmits 112, 114 the data unit portions at least partially in parallel through the network interfaces 312, 314. In some embodiments, the controller 300 includes a security override option 316, and if the security override is enabled then data sent over the first interface is not treated 110 by the supplemental security module 310 before being sent through the first interface. In some embodiments the controller 300 receives 106 a subset of data unit, divides 108 the data unit in anticipation of receiving the remainder of the data unit, treats 110 a portion of the data unit selected in random order and transmits 112, 114 the data unit portions at least partially in parallel through the network interfaces 312, 314.

In some embodiments the controller 300 may modify the IP and TCP headers and source and destination addresses in order to complete or facilitate data exchange. For example, if the controller encrypts data it may change the source address and source port number, as is done in VPNs. If each end of the communication path includes a controller, then one or both of those controller may replace source and destination address and port numbers. If an embodiment performs application-level filtering, then packets may also be tagged with quality of service priority values.

Figure 4:
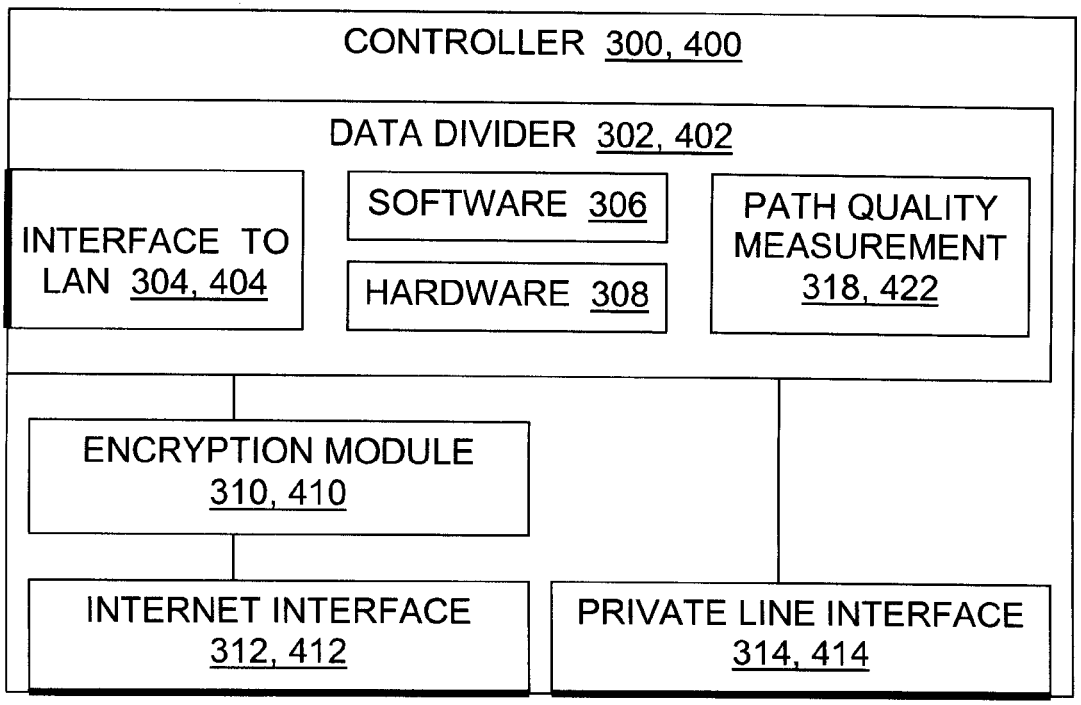
FIG. 4 is a block diagram further illustrating particular controller devices of the present invention.

The controller 300 may handle network traffic of one or more types, including IP, IPX, TCP, UDP, DDP, or other network protocols. In some embodiments, the first interface 312 interfaces to an open public network, e.g., by a connection to a router 504 in that open public network, and the second interface 314 interfaces to a virtual private network, by means of another router 504 connection or other familiar means. In some embodiments, as indicated by FIG. 4, the second interface 414 interfaces to a private line instead of a VPN.

The data divider 302 and other controller 300 components may be implemented using special purpose hardware 308 such as FPGA, ASIC, PAL, or similar hardware, or the controller components may be implemented in software which configures general-purpose computer hardware 308 (processor, memory, buses, etc.). In general, controllers will include a mixture of software 306 and hardware 308 configured to operate together to perform methods described herein.

In some embodiments, the supplemental security module 310 treats 110 data by encryption, imposing an authentication requirement on the data source and/or destination, watermarking, digital signing, and/or other protective measures. Such measures may be hard-coded, or the supplemental security module may operate in response to a security selection 320 by a user, administrator, or other controller, on a per-session basis, for instance. The election of measures to use if available, and/or the specification of minimum acceptable sets of measures for a given session or a given file, can be based on a policy 318 specified by an administrator and/or an end user, or it can be hard-wired into the controller by the controller's manufacturer. In one embodiment, the encryption selection 320 allows a controller's user to select between at least two of the following: a symmetric encryption, an asymmetric encryption, an encryption meeting a DES standard, an encryption meeting a United States governmental export standard. The controller may send encrypted data 510 over the first interface and plaintext data 512 over the second interface, for example, or it may send encrypted data over both networks with one encryption being stronger than the other (as measured by key length, time required for a successful brute force decryption, or other familiar measures of encryption strength).

As indicated by FIG. 5, the controller may be part of a larger system 500 which embodies or operates according to the present invention. For instance, in some systems the controller 300 is a local controller (e.g., at the top of FIG. 5) which communicates 104 with a remote controller (at the bottom of FIG. 5) to identify available security measures. The local controller receives from the remote controller a list 516 identifying available security measures, such as which encryption algorithms and levels are available, and whether software 306 is in place to detect data tampering. The local controller responds 516 to the remote controller with an election specifying which security measure(s) to use, or else the local controller responds with an indication that the available security measure(s) are inadequate and the data will therefore not be transmitted through the local controller at this time.

The controller 400 shown in FIG. 4 illustrates some alternate embodiments that will be understood by those of skill with assistance from the present document. As indicated in the figures, some components of the controller in FIG. 4 are special cases of the more general component categories shown in FIG. 3. The controller 400 is particularly well suited for efficient secure parallel data transmission. It includes an internet network interface 412 which interfaces the controller to an internet node; a private network interface 414 which interfaces the controller to a private network (VPN or private line); an encryption module 410 which receives data, encrypts/decrypts the data, and directs encrypted/decrypted data to the internet/LAN interface; and a data divider 402 which receives a data unit, divides the data unit into a first portion and a second portion, directs the first portion to the encryption module, and directs the second portion to the private network interface bypassing the encryption module. The controller 400 may receive a data unit over a LAN interface 404, divide the data unit, encrypt only the first portion of the divided data unit, and transmit the data unit portions at least partially in parallel through the network interfaces 412, 414 and hence over the disparate networks.

CONCLUSION

Although particular embodiments of the present invention are expressly illustrated and described herein as methods, for instance, it will be appreciated that discussion of one type of embodiment also generally extends to other embodiment types. For instance, the descriptions of data transmission methods also help describe controllers 300 for data transmission and systems 500 with which data is transmitted. It does not follow that limitations from one embodiment are necessarily read into another.

Embodiments such as the methods illustrated or corresponding systems may omit items/steps, repeat items/steps, group them differently, supplement them with familiar items/steps, or otherwise comprise variations on the given examples. Suitable software to assist in implementing the invention is readily provided by those of skill in the pertinent art(s) using the teachings presented here and programming languages and tools such as C++, C, Java, Pascal, APIs, SDKs, network protocol stacks, assembly language, firmware, microcode, and/or other languages and tools.

Headings are for convenience only; information on a given topic may be found outside the section whose heading indicates that topic. All claims as filed are part of the specification and thus help describe the invention, and repeated claim language may be inserted outside the claims as needed.

It is to be understood that the above-referenced embodiments are illustrative of the application for the principles of the present invention. Numerous modifications and alternative embodiments can be devised without departing from the spirit and scope of the present invention.

As used herein, terms such as "a" and "the" and designations such as "interface" and "dividing" are inclusive of one or more of the indicated item or step. In particular, in the claims a reference to an item generally means at least one such item is present and a reference to a step means at least one instance of the step is performed.

The scope of the invention is indicated by the appended claims rather than by the foregoing description. All changes which come within the meaning and range of equivalency of the claims are to be embraced within their scope to the full extent permitted by law.

We claim:

1. A method of preparing data for transmission, comprising:
    obtaining connections to at least two networks which are at least partially in parallel and which differ in their respective security characteristics;
    receiving data packets in a first collection of data packets;
    receiving data packets in a second collection of data packets;
    treating each of the data packets of the first collection with a supplemental security measure which corresponds to a difference in respective security characteristics of a first network, namely, the internet, and a second network, namely, a private network, wherein the supplemental security measure for treating a data packet includes at least encrypting data in the data packet according to a security policy;
    submitting the encrypted data packets of the first collection for transmission over a first path over the internet; and
    submitting the data packets of the second collection for transmission over a second path through the private network, without treating the data packets of the second collection with the supplemental security measure;
    wherein transmission of the data packet collections utilizes the networks, which are at least partially in parallel and which differ in their respective security characteristics, and data packets to be transmitted over one of the networks have been treated before their transmission over that network with a security measure which is not applied before transmission to data packets that are to be transmitted over another network.

2. The method of claim 1, wherein the step of receiving data packets in a first collection is interleaved with the step of receiving data packets in a second collection, in that receipt of at least one data packet of the first collection occurs between receipt of at least two data packets of the second collection, and receipt of at least one data packet of the second collection occurs between receipt of at least two data packets of the first collection.

3. The method of claim 1, wherein the supplemental security measure further includes at least one of the following: user authentication, transmission source authentication, data watermarking, data tamper-detection, physical security restricting physical access to machines.

4. The method of claim 1, wherein the supplemental security measure includes a particular form of data encryption which is different than an encryption used on the second network.

5. The method of claim 1, further comprising tracking at least one of the following: data throughput, transmission latency, transmission bandwidth, time required for encryption of data.

6. The method of claim 1, further comprising dividing the data packets between the first collection and the second collection at least partly in response to at least one of the following: first path load, second path load, first path failure, second path failure.

7. The method of claim 1, further comprising receiving a security policy specification from at least one of an administrator, an end user, and a controller device; and wherein the treating step is responsive to the security policy specification.

8. The method of claim 1, further comprising receiving a revocable security override from at least one of an administrator and an end user; and wherein while the security override is in effect data packets in the first collection are not encrypted.

9. The method of claim 1, further comprising receiving from at least two networks a group of data packets, resequencing the data packets, and transmitting the resequenced data packets to an adjacent local area network which is identified in the packets as their destination.

10. A controller for data transmission, comprising:
    components configured for transmission of data packets utilizing at least two networks at least partially in parallel to efficiently compensate for lower security in one network, namely:
    a first interface to a first wide area network which has a first set of security characteristics;
    a second interface to a second wide area network which has a second set of security characteristics, the second set of security characteristics including at least one distinguishing security characteristic that is not present in the first set of security characteristics;
    a supplemental security module which receives data, treats the data with a supplemental security measure including at least encryption in response to a security policy specification, and directs treated data to the first interface;
    a third interface to a local data source, the third interface capable of receiving data packets, directing some received packets to the supplemental security module, and directing other received packets to the second interface bypassing the supplemental security module;
    at least one hardware bus connecting at least one of the interfaces with the supplemental security module;
    wherein the controller includes software and hardware configured to operate together to receive data packets from the local data source, treat only a portion of the received data packets, and transmit the treated and untreated data packets at least partially in parallel through the wide area network interfaces;
    whereby transmission of the data packets utilizes the networks at least partially in parallel in a manner calculated to efficiently compensate for the lower security of the first network.

11. The controller of claim 10, wherein the controller handles traffic of at least one of the following types: IP, IPX, TCP, UDP.

12. The controller of claim 10, wherein at least one of the following holds: the first interface is configured to interface to an open public network, the second interface is configured to interface to a virtual private network.

13. The controller of claim 10, wherein the controller further comprises a network router module.

14. The controller of claim 10, wherein the controller is a local controller which is capable of communicating with a remote controller to identify available security measures.

15. The controller of claim 14, wherein the local controller is capable of receiving from the remote controller a list identifying available security measures, and the local controller is capable of responding to the remote controller with at least one of the following: an election specifying which security measure(s) to use, an indication that the available security measure(s) are inadequate and the data will therefore not be transmitted through the local controller.

16. The controller of claim 10, wherein the controller is configured to send encrypted data over the first interface and to send plaintext data over the second interface.

17. The controller of claim 16, wherein at least one of the following holds: the first interface is configured to interface to the internet, the second interface is configured to interface to a private network.

18. The controller of claim 10, comprising an encryption module which is capable of receiving data packets from at least two wide area network interfaces, identifying encrypted packets and decrypting them, and the controller is capable of delivering decrypted data packets to an attached local area network.

19. The controller of claim 10, further comprising a resequencing module which is capable of receiving data packets from at least two wide area network interfaces and resequencing them, and the controller is capable of delivering resequenced data packets to an attached local area network.

20. The controller of claim 10, wherein the supplemental security module is configured to treat data by at least one of the following: authentication, and watermarking; and wherein the supplemental security module is configured to do so in response to a security selection.

21. The controller of claim 10, further comprising a security override, and wherein if the security override is enabled then the controller is configured to not treat data sent over the first interface, thereby allowing temporary suspension of application of supplemental security.

22. A controller for efficient secure parallel data transmission, comprising:
  components configured for transmission of data packets at least partially in parallel and to efficiently compensate for lower internet security while transmitting at least partially in parallel over the internet and a private network, namely:
  an internet network interface which is configured to interface the controller to an internet node;
  a private network interface which is configured to interface the controller to a private network which has higher security than the internet;
  a supplemental security module which treats data at least by encryption and which is configured to receive data, encrypt the data, and direct encrypted data to the internet interface, the supplemental security module also capable of receiving data packets from at least two wide area network interfaces, identifying encrypted packets and decrypting them, and capable of delivering decrypted data packets to an attached local area network;
  a local area network interface which is configured to receive data packets, direct a first portion of the packets to the supplemental security module, and direct a second portion of the packets to the private network interface bypassing the supplemental security module;
  a power supply;
  wherein the controller compensates efficiently for the lower security of the internet while transmitting at least partially in parallel over the internet and the private network, in that the controller includes software and hardware configured to operate together to receive data packets locally, encrypt only the first portion of the packets, and transmit the data packets at least partially in parallel through the network interfaces.

23. The controller of claim 22, wherein the supplemental security module is configured to respond to an encryption selection to allow a user of the controller to select between at least two of the following: a symmetric encryption, an asymmetric encryption, an encryption meeting a DES standard, an encryption meeting a United States governmental export standard.

24. The controller of claim 22, wherein the controller is a local controller, in combination with a remote controller which is configured to communicate with the local controller to coordinate security for a data transmission, thereby facilitating a secure efficient parallel data transmission system.

25. The controller of claim 22, wherein the controller further comprises a router.

* * * * *